United States Patent
Eletto et al.

[15] 3,689,568
[45] Sept. 5, 1972

[54] PREPARATION OF PRIMARY MERCAPTANS

[72] Inventors: Richard J. Eletto, 24 Leatherstocking Lane, White Plains, N.Y. 10603; Donald J. Martin, 140 N. Broadway, Irvington, N.Y. 10533

[22] Filed: Aug. 13, 1969

[21] Appl. No.: 849,888

Related U.S. Application Data

[63] Continuation-in-part of Ser. No. 830,497, June 4, 1969, abandoned.

[52] U.S. Cl. .........260/609 B, 260/465.1, 260/481 R, 260/551 R, 260/583 EE, 260/593 R, 260/606.5 P
[51] Int. Cl.............................................C07c 149/06
[58] Field of Search ........260/609 B, 830, 497, 465.1

[56] References Cited

UNITED STATES PATENTS

| | | | |
|---|---|---|---|
| 2,101,096 | 12/1937 | Reuter et al. | 260/609 |
| 2,386,769 | 10/1945 | Baderstscher et al. | 260/609 |
| 2,950,324 | 8/1960 | Loeu | 260/609 |
| 3,223,738 | 12/1965 | Crain | 260/609 |

*Primary Examiner*—Joseph Rebold
*Assistant Examiner*—Delbert R. Phillips
*Attorney*—Wayne C. Jaeschke, Robert C. Sullivan, Paul J. Juettner and Daniel S. Ortiz

[57] ABSTRACT

The non-Markownikoff reaction of hydrogen sulfide with a hydrocarbon or substituted hydrocarbon having at least one olefinic linkage is accomplished by reacting hydrogen sulfide and hydrocarbon in the presence of a trivalent organic phosphorus compound as the sole initiator.

14 Claims, No Drawings

PREPARATION OF PRIMARY MERCAPTANS

CROSS REFERENCE TO RELATED APPLICATION

This application is a continuation-in-part of Ser. No. 830,497, filed June 4, 1969, titled Preparation of Sulphur Containing Compounds, now abandoned.

BACKGROUND OF THE INVENTION

The reaction of hydrogen sulfide with hydrocarbons containing an olefinic linkage is well known in the art. The non-Markownikoff reaction of hydrogen sulfide with alphaolefins yields primary mercaptans and sulfides directly. In order to achieve this non-Markownikoff reaction an initiator is necessary. Many initiator systems have been employed and are well known in the art. Various azo compounds have been used alone and together with Friedel-Crafts catalysts, nickel, water and other promoters to bring about this addition. Likewise, various peroxides and percarbonates, alone and together with promoters like those named above, also give the non-Markownikoff reaction. Besides the chemical catalyst systems described above, actinic light has been found to induce the non-Markownikoff reaction. Increased yields in the photochemical process have been achieved by using various sensitizers and promoters such as aromatic mercaptans, water and trialkyl phosphites. These promoters or sensitizers are believed to absorb the light energy at one frequency and either form free radicals which can initiate the reaction or re-transmit the energy at a frequency which initiates free-radical formation.

DETAILED DESCRIPTION OF THE INVENTION

It has now been discovered that the non-Markownikoff reaction of hydrogen sulfide with an olefin can be achieved by reacting the hydrogen sulfide and olefin together in the presence of an initiator consisting essentially of a trivalent organic phosphorus compound. That is to say, the trivalent organic phosphorus compound is present as the sole initiator.

The mercaptans and sulfides produced by the process of the present invention have wide utility as raw materials for making insecticides, herbicides, repellants, rubber vulcanizers and surfactants.

The present invention is directed to the non-Markownikoff reaction of hydrogen sulfide with an olefin as opposed to the Markownikoff reaction. In the ionic (acid or base) catalyzed reaction, addition across the olefinic linkage takes place in accordance with the Markownikoff rule, i.e., "normal" addition in which the sulfhydryl radical attaches to the unsaturated carbon atom having the lesser number of hydrogen atoms attached thereto. In the reaction of the present invention, "abnormal" or non-Markownikoff addition takes place, that is the sulfhydryl radical attaches to the unsaturated carbon atom having the most hydrogen atoms attached thereto. For example, when an alpha-olefin is reacted under acid catalyzed addition, a secondary mercaptan, namely a 2-thiol, is formed; whereas, in the process of the present invention, the alpha-olefin is converted to a primary mercaptan, namely a 1-thiol. The primary mercaptan can then attack another olefin molecule to give the primary sulfide.

In accordance with the present invention, hydrogen sulfide and a hydrocarbon or substituted hydrocarbon containing at least one olefinic linkage are reacted in the presence of a trivalent organic phosphorus compound as the sole initiator. The reaction of the present invention can be carried out with or without a diluent. Trivalent organic compounds which are effective as the sole initiator in this reaction have the generic formula:

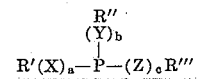

where X, Y and Z are each a chalcogen having an atomic weight between 14 and 33; $a$, $b$ and $c$ are each equal to 0 or 1, and R', R'' and R''' are hydrocarbon radicals having from one to 20 carbon atoms. The hydrocarbon radicals can each be alkyl, aryl, alkaryl, or arylalkyl. In the preferred embodiment of this invention, $a$, $b$ and $c$ are equal to 1 and R', R'', R''' are lower alkyl having from one to four carbon atoms or aryl having from six to nine carbon atoms. These compounds are illustrated by the alkyl and aryl phosphines, phosphites, phosphonites and phosphinites such as; trimethyl phosphine, tributyl phosphine, triphenyl phosphine, trimethyl phosphite, tributyl phosphite, trihexyl phosphite, tritolyl phosphite, dimethyl methyl phosphonite, diphenyl phenyl phosphonite, diethyl methyl phosphonite, dimethyl butyl phosphonite, trimethyl thiophosphonite, dimethyl ethyl thiophosphonite, phenyl thiophosphinite and tributyl thiophosphite.

In the process of the present invention, an essentially hydrocarbon compound having at least one olefinic linkage is used. By the term, "essentially hydrocarbon", it is meant consisting essentially of hydrogen and carbon. It may contain two or more olefinic linkages, for example, 1,3-butadiene, isoprene or the like can be used. However, the hydrocarbon must contain at least one olefinic linkage in the aliphatic or cycloaliphatic grouping as distinct from the unsaturated linkage in an aromatic molecule such as benzene. The carbon atoms containing the olefinic linkage can have attached thereto an alkyl, cycloalkyl, aryl, aryl-alkyl, alkaryl or other branched or straight chained hydrocarbon substituent. Furthermore, the group attached to the olefinic carbon atoms can be substituted hydrocarbons having substituents which are inert with respect to the reaction of the present invention. Illustrative of these substituents are: cyano, carboxyl, carbonyl, tertiary amines, halogens, sulfoxides, sulfones, hydroxyl, ethers, thioethers, carboxylic esters, amides and the like. Trivalent and pentavalent phosphorus groups can also be attached to the hydrocarbon.

This invention is particularly useful for the manufacture of primary mercaptans and sulfides from hydrocarbons having an olefinic linkage to a terminal carbon atom, that is an alpha-olefin. For example, 1-butene can be converted in high yield to 1-butanethiol, and di-n-butyl sulfide. Likewise, 1-octene and 1-dodecene can be converted to 1-octanethiol and di-n-octyl sulfide, and 1-dodecanethiol and di-n-dodecylsulfide respectively. Thus, alpha-olefins having from two to 30 carbon atoms can be converted to their corresponding primary mercaptans and sulfides. Suitable olefins for this reaction include ethylene, propylene, 1-butene, isobutene, 1-pentene, 2-pentene, 1-hexene, 1-octene, 1-nonene, styrene, 1-dodecene, 1-decene, 1-tridecene, 1-undecene, 1-heptadecene, 2-methylhexene-1, 3-methyl-2-ethyl-1-pentene, 3,3-dimethyl-1-heptene, 4-methyl, 2-propyl-1-pentene, vinyl cyclohexane, 3-phenyl-1-pentene, 1,3-butadiene, 1,3-pentadiene, 1,5-hexadiene, 1,7-octadiene, 3,4-diethyl-1,5-hexadiene, propylene dimer, propylene trimer, propylene tetramer, 3-chloro-1-hexene, 5-nitro-1-pentene, p-chloro-styrene, m-nitro-styrene and 5-cyano-1-pentene.

In addition to the olefins described above, olefins having inert groups attached directly to the olefinic carbon atoms can be employed in the present invention. These inert groups can be illustrated by: cyano, halogen, ethers, carboxyl and carboxylate (including both the acrylic esters, in which the olefinic carbon atom is linked to the carboxyl carbon atom, and the vinyl esters, in which the olefinic carbon atom is linked to an oxygen atom of the carboxyl group) and the like. Examples of this type of compound are: vinyl chloride, vinyl bromide, 3-ethoxy-pentene-2,2-chloroeicosene-2,2-butenyl phenyl ethyl ether, methyl vinyl ether, divinyl ether, acrylic acid, ethyl acrylate, methyl methacrylate, maleic acid, 2-cyano-2-butene and the like.

The reaction of the present invention can be conducted with or without a diluent. The diluent should be inert with respect to the reactants and products. Suitable diluents include saturated and aromatic hydrocarbons. These diluents can be illustrated by pentane, hexane, octane, cyclopentane, cyclohexane, benzene, toluene and xylene.

The amount of trivalent phosphorus compound used in the present invention is in the range from about 0.005 to about 1 mole of phosphorus compound per mole of olefinic linkage. The preferred range for the present invention is from about 0.01 to about 0.5 mole of phosphorus compound per mole of olefinic linkage. The hydrogen sulfide should be present in an amount in the range from about 1 to about 20 moles of hydrogen sulfide per mole of olefinic linkage. The higher the hydrogen sulfide to olefin ratio, the higher mercaptan to sulfide ratio is going to be in the products.

The reaction can be conducted over a wide range of temperatures. Normally the reaction temperature will be in the range from about 50° C. to about 200° C. In the preferred embodiment of the present invention, temperatures in the range from about 80° C. to about 110° C. are employed.

The reaction can be run in a batch system, a continuous operation, or in a series of reactions. For example, all of the hydrogen sulfide, olefin and initiators can be added at once or the olefin and hydrogen sulfide can be added as separate streams to a continuous reactor system with an appropriate addition of the initiator in the proper proportions, either separately or along with the olefin or hydrogen sulfide. If desired, a coil reactor can also be employed with injection of the initiator along the coil at various points. As another embodiment of the present invention, the trivalent phosphorus promoters can be generated in situ by adding phosphine to the olefin to yield the trivalent organic phosphorus compounds which can then act as the promoter.

The following examples further illustrate the practice of the present invention. Example I is the control employing no promoter.

EXAMPLE I 50 milliliters of benzene were placed in a stainless steel autoclave equipped with a gas inlet, thermocouple well, and a rupture disc assembly rated at 2,000 psi. The autoclave was then sealed and evacuated (although evacuation was shown to be not necessary, it insured against the presence of some foreign substance which might affect the reaction, i.e., traces of peroxides). After cooling the autoclave in a nitrogen bath, 0.2 mole of ethylene and 1.0 mole of hydrogen sulfide were charged to the autoclave. The autoclave was heated to 90° C. ($\pm$ 5° C.) and this temperature was maintained for 5 hours. The reaction mixture was then cooled to 10° C. and was analyzed with a gas chromatograph using a 12 feet by 18 inches coil column containing 3 percent OV-1 on 80–100 mesh Chromosonb G. Analysis showed that virtually none of the ethylene had reacted.

EXAMPLE II 1.0 grams (0.008 moles) of trimethyl phosphite and 50 milliliters of benzene were placed in an autoclave equipped as in Example I. The autoclave was sealed and evacuated. After cooling the autoclave in a nitrogen bath, 0.2 mole of ethylene and 1.0 mole of hydrogen sulfide were charged to the autoclave. The autoclave was then heated to 90° C. ($\pm$ 5° C.) and this temperature was maintained for 5 hours. The reaction mixture was then cooled to 10° C. and analyzed as in Example I. Analysis showed that 68 percent of the ethylene had been converted. 58 percent of the initial ethylene was converted to ethyl mercaptan and 10 percent of it has converted to diethyl sulfide.

EXAMPLE III

Using the same method that was employed in Example II, 1.24 grams (0.01 mole) of trimethyl phosphite was employed as the initiator and 0.2 moles of propylene was substituted for the ethylene. The analytical results showed that 79 percent of the propylene had been converted yielding 56 percent n-propyl mercaptan. The mercaptan to sulfide ratio was 23.3:1.

EXAMPLE IV

Using 2.2 grams (0.01 mole) of tributyl phosphine as the initiator and 0.2 mole of propylene, the same process as Example II was carried out. The conversion of the olefin was 11 percent and the yield of n-propyl mercaptan was 3.7 percent of the initial olefin.

Other examples were run using the same method and 0.2 moles of propylene was employed as the olefin. The results of these examples are contained in Table I.

TABLE I

| Example Number | Promoter Used | Amt. of Promoter Moles | Conversion of olefin | Yield of Mercaptans |
|---|---|---|---|---|
| V | tributyl phosphine | 0.005 | 11% | 3.7% |
| VI | triethyl phosphite | 0.006 | 64% | 43% |
| VII | triphenyl phosphite | 0.01 | 30% | 16.6% |
| VIII | tributyl phosphite | 0.01 | 5.9% | 3.0% |

What is claimed is:

1. Process for preparing primary mercaptans which comprises reacting hydrogen sulfide with an alpha-olefin wherein said alpha-olefin is selected from the group consisting of ethylene, propylene, 1-butene, isobutene, 1-pentene, 2-pentene, 1-hexene, 1-octene, 1-nonene, styrene, 1-dodecene, 1-decene, 1-tridecene, 1-undecene, 1-heptadecene, 2-methylhexene-1, 3-methyl-2-ethyl-1-pentene, 3,3-dimethyl-1-heptene, 4-methyl,2-propyl-1-pentene, vinyl cyclohexane, 3-phenyl-1-pentene, 1,3-butadiene, 1,3-pentadiene, 1,5-hexadiene, 1,7-octadiene, 3,4-diethyl-1,5-hexadiene, propylene dimer, propylene trimer, propylene tetramer, 3-chloro-1-hexene, 5-nitro-1-pentene, p-chlorostyrene, m-nitro-styrene and 5-cyano-1-pentene, and an initiator consisting essentially of a trivalent organic phosphorus compound having the formula:

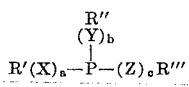

wherein X, Y and Z are each chalcogen having an atomic weight between 15 and 33; $a$, $b$ and $c$ are each equal to 0 or 1; and R′, R″ and R‴ are each a hydrocarbon radical having from one to 20 carbon atoms; said trivalent phosphorus compound being present in an amount from about 0.005 to about 1 mole per mole of olefinic linkage, at a temperature in the range from about 50° C. to about 200° C.

2. The process of claim 1 wherein said trivalent phosphorus compound is present in an amount from about 0.01 to about 0.5 mole per mole of olefinic linkage.

3. The process of claim 1 wherein the olefin is ethylene.

4. The process of claim 1 wherein the olefin is propylene.

5. The process of claim 1 wherein the process is carried out in the presence of an inert diluent.

6. The process of claim 1 wherein said phosphorus compound is a phosphite.

7. The process of claim 1 wherein said phosphorus compound is a phosphine.

8. The process of claim 1 wherein said phosphorus compound is trimethyl phosphite.

9. The process of claim 1 wherein said phosphorus compound is triethyl phosphite.

10. The process of claim 1 wherein said phosphorus compound is triphenyl phosphite.

11. The process of claim 1 wherein said phosphorus compound is tributyl phosphite.

12. The process of claim 1 wherein said phosphorus compound is tributyl phosphine.

13. The process of claim 1 wherein said phosphorus compound is trimethyl phosphine.

14. The process of claim 1 wherein said phosphorus compound is triphenyl phosphine.

* * * * *

UNITED STATES PATENT OFFICE
CERTIFICATE OF CORRECTION

Patent No. 3,689,568   Dated Sept. 5, 1972

Inventor(s) Richard J. Eletto and Donald J. Martin

It is certified that error appears in the above-identified patent and that said Letters Patent are hereby corrected as shown below:

Please add:

[73] Assignee:   STAUFFER CHEMICAL COMPANY, New York, New York

Signed and sealed this 10th day of April 1973.

(SEAL)
Attest:

EDWARD M. FLETCHER, JR.
Attesting Officer

ROBERT GOTTSCHALK
Commissioner of Patents